UNITED STATES PATENT OFFICE.

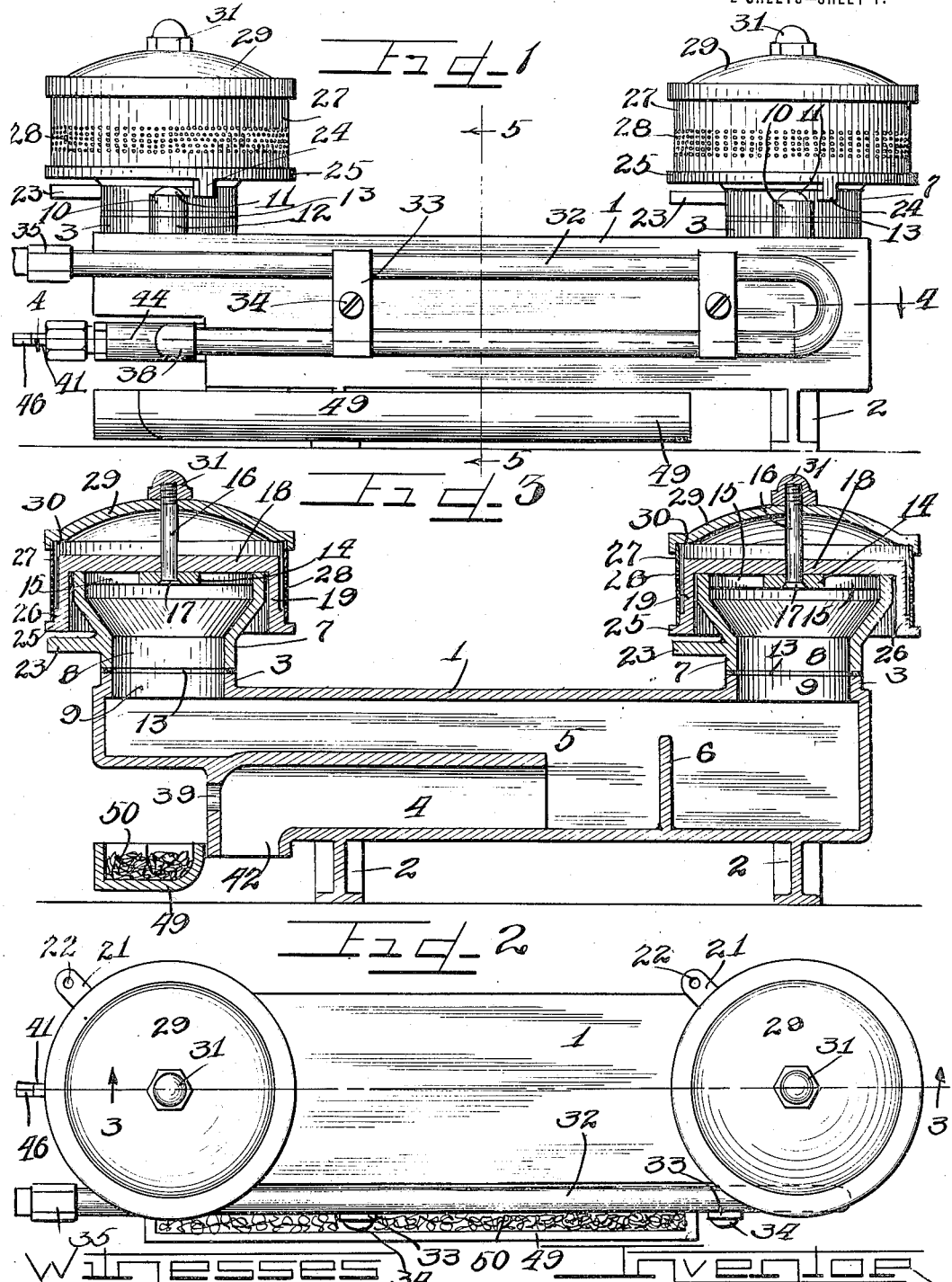

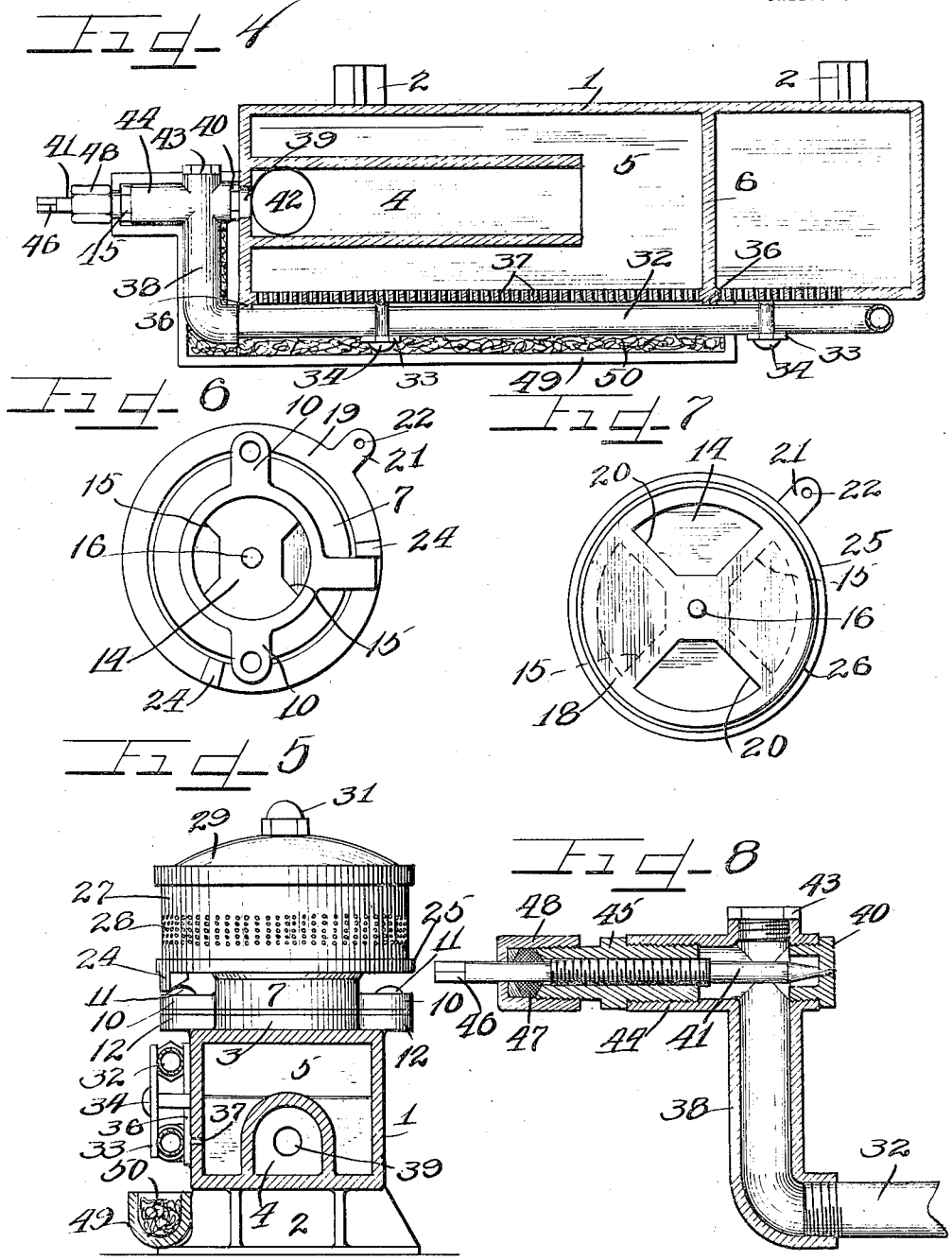

AUGUST A. RUSTEBERG, OF CHICAGO, ILLINOIS, ASSIGNOR, BY MESNE ASSIGNMENTS, TO THE CHAMPION KEROSENE-BURNER COMPANY, OF KENTON, OHIO, A CORPORATION OF OHIO.

OIL-BURNER.

1,320,929.　　　　Specification of Letters Patent.　　Patented Nov. 4, 1919.

Application filed January 29, 1919. Serial No. 273,799.

*To all whom it may concern:*

Be it known that I, AUGUST A. RUSTEBERG, a citizen of the United States, and a resident of the city of Chicago, in the county of Cook and State of Illinois, have invented certain new and useful Improvements in Oil-Burners; and I do hereby declare that the following is a full, clear, and exact description of the same, reference being had to the accompanying drawings, and to the numerals of reference marked thereon, which form a part of this specification.

My invention has reference more particularly to a device for vaporizing oil, such as kerosene, and mixing it with a suitable quantity of air and supplying the mixture to a burner for combustion.

An object of my invention is to provide a device of this character of simple form and substantial construction which is adapted to afford a suitable mixture of hydro-carbon vapor and air and supply same to a burner or burners forming a part of the device.

Another object of my invention is to provide a unitary structure adapted to be used as an attachment in stoves or ranges, and comprising an improved type of generator for vaporizing a hydro-carbon oil and mixing the vapor with a suitable quantity of air and having an improved form of burner to which the mixture is supplied.

Another object of my invention is to provide an improved type of burner and control for regulating the operation thereof.

My invention also has other important objects which will appear from the following specification and the accompanying drawings, in which I have described and illustrated my invention in a preferred form.

On the drawings:

Figure 1 is a side view of the generator and burner.

Fig. 2 is a top view therof.

Fig. 3 is a longitudinal sectional view on the line 3—3 of Fig. 2.

Fig. 4 is a longitudinal sectional view, with certain parts in elevation, on the line 4—4 of Fig. 1.

Fig. 5 is a transverse sectional view on the line 5—5 of Fig. 1.

Fig. 6 is a bottom view of one of the burners detached from the generator.

Fig. 7 is a top view of one of the burners with the cap and perforated shell thereof removed.

Fig. 8 is an enlarged sectional view of the valve structure for regulating the supply of vapor to the mixing chamber.

As shown on the drawings:

The reference numeral 1 indicates the main casing of the device which serves as a mixing chamber and reservoir for the fuel, and from which the fuel mixture is supplied to the burners, said casing being preferably, although not necssarily, a one piece casting with a leg or support 2 on the bottom at each end and a flanged outlet 3 opening through the top thereof at each end. A passageway 4 is cored lengthwise of the casing 1, along the bottom thereof and opens into the main chamber of the casing 1 at a point substantially midway of the ends thereof so as to afford an equal distribution of the mixture from the duct 4 to both ends of the chamber 5, in the casing. To further insure such equal distribution there is a baffle plate 6 rising from the bottom of the casing 1, in front of and spaced from the outlet end of the duct 4, to deflect the incoming mixture and prevent an excessive supply thereof being furnished to the right hand end of the chamber 5, looking at Fig. 3, and a consequent scarcity of the mixture at the opposite end of the chamber 5. The cross sectional area of the duct 4 is considerably less than the cross section of the chamber 5, so that a space is provided above and at each side of the duct 4 for passage of the gas mixture back to the burner at the left hand end of the casing 1 (looking at Fig. 3).

The device illustrated is provided with two burners, although I contemplate of course that the device may be provided with more or less burners if desired, and each of these burners is similar in construction.

The burner comprises a head 7, having an opening 8, which registers with the opening 9, from the casing 1, said head being provided with ears 10, through which cap screws 11 are inserted and threaded into lugs 12, provided therefor on the upper surface of the casing 1, for securing the burners to the casing, and a gasket 13, may be interposed between the head 7 and the flange 3 of the casing to seal the joint therebetween.

The upper end of the head 7 is expanded as shown and closed by a plate 14, having openings 15 therethrough affording an outlet for the fuel mixture from the casing 1. A pin 16 projects upwardly through the center of the plate 14, being retained therein by the head 17, and projects through a central aperture in the cap 18, which rests upon and covers the upper end of the head 7 and is adapted to rotate thereon on the pin 16 as an axis. This cap 18 has a depending flange 19 around the head 7, and the top of the cap has openings 20 therethrough of a form corresponding to the openings 15 through the top of the head 7, and adapted to register therewith to admit fuel to the burner. By turning the cap 18 the passage through the openings 15 and 20 may be regulated, or the openings 15 may be entirely closed by rotating the cap 18 so that the solid portion thereof completely covers the openings 15 and interrupts the supply of fuel to the burner. An arm 21 projects radially from the lower edge of the flange 19, and is provided with a perforation 22, so that a connection may be made with the arm 21 for operating the cap 18 from a distance, as for example from the exterior of the stove in which the burner is mounted. An arm 23 also projects laterally from the head 7, under the flange 19, and the latter has a pair of depending lugs 24 for engagement with the arm 23 and properly spaced to permit only the necessary movement of the cap 18 to open and close the openings 15 through the head.

Extending around the lower edge of the flange 19, is an annular flange 25, which is stepped as shown to provide a shoulder 26, and a perforated drum or shell 27 incloses the cap 18 and is seated on the flange 25, and held spaced from the flange 19 of the cap 18 by the shoulder 26 to provide an annular space around the cap 18 for supplying the gas mixture from above the cap 18, down around the sides of the cap and out through the perforations 28, of the shell 27. A dome shaped cover 29, is provided with an annular seat 30, for the upper end of the shell or drum 27, and has a central perforation through which the stem 16 is passed, and there is a nut 31 threaded on the outer end of the stem 16 against the outer face of the cover 29, so as to clamp the cover against the upper end of the shell 27, and hold the shell 27 down against the flange 25, of the cap 18, thereby affording a chamber between the cap 18 and the cover 29, through which the fuel mixture may be supplied from the casing 1, through the head 7, and out through the perforations 28 of the shell 27.

A U-shaped vaporizer tube 32 is secured to the front of the casing 1, by means of clamp plates 33 and screws 34, which latter are inserted through the clamp plates and threaded into the wall of the casing 1, and the upper length of this U-shaped tube has a coupling 35 at the end for connecting the vaporizer tube with a source of fuel supply. The lower length of the U-shaped tube 32 is spaced a slight distance from the front wall of the casing 1 by means of the lugs 36, and the front wall of the casing 1 has a plurality of perforations 37, in front of which the lower length of the tube 32 is located, and through which fuel mixture is supplied from the chamber of the casing 1, to provide a burner for heating the tube 32. An elbow extension 38 is connected to the end of the lower length of the U-shaped tube 32, and projects across the end face of the casing 1, and there is an opening from this extension 38 directly in front of an opening 39 at the outer end of the duct 4, said opening from the extension 38 being provided with a bushing 40, with a jet opening therethrough controlled by the needle valve 41, and adapted to inject the vapor from the vaporizer tube into the duct 4 in the direction of its length.

The duct 4 has a downward extension at its outer end which is entirely open, as shown at 42, to admit air into the duct 4 to be mixed with the vapor injected through the opening 39, the air being taken in partly by the suction created by the jet and partly by the natural draft through the duct 4, occasioned by the combustion of the fuel at the burners.

The elbow extension 38 may have a threaded opening at its end closed by the threaded plug 43, to facilitate cleaning of the pipe 38, and there is an internally threaded extension 44 extending outwardly from the pipe 38 opposite the outlet bushing 40, and in this extension is threaded a valve casing 45. A valve 41 is threaded through the valve casing 45 so that it may be adjusted to regulate the discharge opening through the bushing 40; and the outer end of the stem is squared or otherwise formed to permit the valve to be turned. Packing 47, is compressed around the stem by means of a packing sleeve 48 threaded on the outer end of the casing 45, to prevent leakage.

For starting the generator and heating the vaporizer tube 32 until the generator furnishes a supply of gas to continue the heating of the tube 32, there is a pan 49, which is secured to the casing 1, and extends around under the lower length of the pipe 32 and the extension 38, and this pan contains asbestos fiber 50 or other material therein to be saturated with oil and ignited for preliminarily heating the vapor tube 32.

The operation is as follows:

For starting the device, a quantity of oil is poured into the pan 49 so as to saturate the material 50, therein, and the oil is ignited so as to heat the pipe 32 and extension 38 thereof. After the pipe has been sufficiently heated, the valve 41 is opened whereupon the vapor which is formed in the pipe 32 by this preliminary heating thereof is injected through the outlet opening of the bushing 40, and opening 39, into the duct 4, of the casing 1. As the vapor passes into the duct 4, it mixes with the air in the duct and additional air which is supplied through the inlet opening 42, and this mixture passes into the chamber 5 of the casing 1, and as soon as the chamber 5 becomes filled with a combustible mixture, a portion thereof is discharged through the perforations 37 in the front wall of the casing and is ignited by the flame from the burning oil in the pan 49, so that as soon as the gas begins to form the auxiliary burner formed by the perforations 37 in the front wall of the casing begins to operate and continues operation thereafter as long as the generator is in use so as to continue the heating of the vaporizing tube 32.

The gas mixture, by means of the arrangement of the duct 4, and the baffle plate 6, is equally distributed to both ends of the chamber 5 in the casing 1, so that a supply is maintained for each of the burner heads 7, the discharge therefrom being controlled by the adjustment of the cap 18, so that the discharge of gas through the head 7 may be regulated or entirely interrupted. By adjusting the cap 18 to uncover the openings 15 from the head 7, the gas is supplied to the compartment between the cap 18 and the cover 29 and passes downwardly around the sides of the cap 18 and out through the perforations 28 in the shell 27, and may be ignited, and by adjusting the cap 18 the supply of gas to the burner may be varied to regulate the combustion so that the amount of heat given off by the burner may be varied as desired. When it is desired to discontinue the use of the burner, it may be turned off by rotating the cap 18, so as to close the outlets 15 from the head 7.

I claim as my invention:

1. A burner comprising a tubular head having an inlet opening in its lower end and an enlarged upper end having a top and openings in such top; a cap fitted on and over said head and adapted to close the openings therein and provided with openings adapted to register with the openings in the head, and having a depending flange provided at its lower end with an exterior flange; a perforated shell supported on the said exterior flange and spaced from the main flange of the cap, and extending above the cap; and a cover resting on the perforated shell; substantially as described.

2. A gas burner comprising a tubular head having an inlet opening in its lower end and an enlarged upper end having a flat top and openings in such top; a cap fitted on and over said head and adapted to close the openings therein and provided with openings adapted to register with the openings in the head, and having a depending flange provided at its lower end with an exterior projecting flange; a perforated shell spaced from the main flange of the cap and supported on the exterior flange of the cap and extending above the cap; a cover resting on the perforated shell; and means confining the cap cover to the head while permitting rotation of the cap and cover on the head.

3. In apparatus of the character specified, an elongated casing having an interior chamber and a longitudinally disposed duct in said chamber opening at one end thereinto and having an air inlet in its lower side near its outer end, said chamber having apertures in its side wall and openings in its top adjacent its ends; a retort at the side of the chamber adapted to be heated by gas issuing through said apertures; a pipe connected with the discharge end of said retort and conducting gas generated therein into the inlet end of said duct; and longitudinally disposed burners connected with the top openings in said casing.

4. In apparatus of the character specified, a chamber, and means for generating gas and discharging same into the chamber; a burner connected with said chamber, and comprising a head having an inlet at its lower end communicating with the chamber and a closed upper end provided with gas openings, a cap fitted over the upper end of said head and adapted in one position to close the openings therein and provided with openings adapted in another position of the cap to register with the openings in the head; an annular shell of larger diameter than the cap surrounding said cap and projecting above the cap; and a cover above the cap supported on said shell.

In testimony whereof I have hereunto subscribed my name in the presence of two subscribing witnesses.

AUGUST A. RUSTEBERG.

Witnesses:
EARL M. HARDINE,
CHARLES W. HILLS, Jr.